(12) United States Patent
Woerdeman et al.

(10) Patent No.: US 9,403,291 B2
(45) Date of Patent: Aug. 2, 2016

(54) INJECTION MOLDED ARTICLES FROM NATURAL MATERIALS AND METHODS FOR MAKING THEM

(71) Applicant: Green Materials, LLC, Merion Station, PA (US)

(72) Inventors: Dara L. Woerdeman, Merion Station, PA (US); Scott Kinney, Hunlock Creek, PA (US); Marko Koorneef, Swedesboro, NJ (US); Ken Bush, Palmyra, PA (US)

(73) Assignee: GREEN MATERIALS, LLC, Merion Station, PA (US)

( * ) Notice: Subject to any disclaimer, the term of this patent is extended or adjusted under 35 U.S.C. 154(b) by 75 days.

(21) Appl. No.: 13/855,428

(22) Filed: Apr. 2, 2013

(65) Prior Publication Data

US 2013/0255537 A1     Oct. 3, 2013

Related U.S. Application Data

(60) Provisional application No. 61/619,380, filed on Apr. 2, 2012.

(51) Int. Cl.
    *B29B 13/00*      (2006.01)
    *B29C 45/00*      (2006.01)

(52) U.S. Cl.
    CPC .............. *B29B 13/00* (2013.01); *B29C 45/0001* (2013.01); *B29K 2003/00* (2013.01); *B29K 2089/00* (2013.01); *B29K 2995/0056* (2013.01)

(58) Field of Classification Search
    CPC ............... B29B 13/00; B29C 45/0001; B29K 2995/0056
See application file for complete search history.

(56) References Cited

U.S. PATENT DOCUMENTS

| | | | | |
|---|---|---|---|---|
| 5,665,152 | A * | 9/1997 | Bassi et al. | 106/145.1 |
| 5,688,448 | A * | 11/1997 | Shutov et al. | 264/54 |
| 7,579,038 | B1 * | 8/2009 | Weinberg | 426/656 |
| 2003/0216492 | A1 * | 11/2003 | Bowden et al. | 524/47 |
| 2005/0008759 | A1 * | 1/2005 | Nie et al. | 426/656 |
| 2005/0101700 | A1 | 5/2005 | Riebel | |
| 2006/0027941 | A1 * | 2/2006 | Woerdeman | 264/129 |
| 2006/0042506 | A1 * | 3/2006 | Woerdeman et al. | 106/125.1 |
| 2006/0155012 | A1 * | 7/2006 | Riebel | 524/17 |
| 2007/0031557 | A1 * | 2/2007 | Axelrod et al. | 426/516 |
| 2008/0233243 | A1 * | 9/2008 | Axelrod et al. | 426/72 |
| 2009/0155421 | A1 * | 6/2009 | Berry | 426/74 |
| 2011/0174191 | A1 * | 7/2011 | Umemura | 106/164.4 |
| 2013/0081972 | A1 * | 4/2013 | Chindyasov | 206/524.7 |

FOREIGN PATENT DOCUMENTS

EP      1602285 A1      12/2005

OTHER PUBLICATIONS

Wall, Disulfide Bonds: Determination, Location, and Influence on Molecular Properties of Proteins, Jul./Aug. 1971, Agricultural and Food Chemistry, vol. 19, No. 4, pp. 619-625.*
Supplementary European Search Report dated Sep. 4, 2015 for European Patent Application No. EP-13-77-1916.
International Search Report for corresponding PCT Patent Application No. PCT/US2011/044483 dated Dec. 9, 2011.

* cited by examiner

*Primary Examiner* — Jill Heitbrink
(74) *Attorney, Agent, or Firm* — Gordon Rees Scully Mansukhani LLP

(57) ABSTRACT

Injection molded articles and methods for making them from bio-based materials are described. More specifically, injection molded articles and methods for making them from bio-based materials that behave like high-molecular-weight thermosets such as lignin or protein-based materials including corn gluten meal, corn gluten feed, distillers dried grains with solubles, wet distillers grains, modified wet distillers grains, canola meal, wheat gluten, barley, cottonseed meal, sunflower meal, linseed meal, soy, rapeseed, sorghum proteins, maize, rice proteins, potato proteins, cassava proteins, sweet potato proteins, yam proteins, plantain proteins, keratin, or collagen are described.

12 Claims, No Drawings

INJECTION MOLDED ARTICLES FROM NATURAL MATERIALS AND METHODS FOR MAKING THEM

CROSS REFERENCE TO RELATED APPLICATIONS

This application claims the benefit of U.S. Provisional Application No. 61/619,380, filed on Apr. 2, 2012, the entire contents of which is hereby incorporated by reference herein.

FIELD

This description relates to injection molded articles and methods for making them from bio-based materials. More specifically, the description relates to injection molded articles made from bio-based materials that behave like high-molecular-weight thermosets such as lignin, or protein-based materials such as corn gluten meal, corn gluten feed, distillers dried grains with solubles, wet distillers grains, modified wet distillers grains, canola meal, wheat gluten, barley, cottonseed meal, sunflower meal, linseed meal, soy, rapeseed, sorghum proteins, maize, rice proteins, potato proteins, cassava proteins, sweet potato proteins, yam proteins, plantain proteins, keratin, or collagen.

BACKGROUND

In today's society, there is a constant and growing need to be ever more conscious of toxins in our environment and in commercial products. Consequently, there is a growing desire have more and more articles made from toxin-free materials rather than from synthetic materials. This description contains new and cost-effective manufacturing methods and alternatives to traditional plastics and composites.

DETAILED DESCRIPTION

Bio-based materials such as lignin or protein-based materials including corn gluten meal, corn gluten feed, distillers dried grains with solubles, wet distillers grains, modified wet distillers grains, canola meal, wheat gluten, barley, cottonseed meal, sunflower meal, linseed meal, soy, rapeseed, sorghum proteins, maize, rice proteins, potato proteins, cassava proteins, sweet potato proteins, yam proteins, plantain proteins, keratin, or collagen, are not traditionally thought of as suitable for injection molding in their present form. Applicants have discovered that, under the right conditions, such bio-based materials behave like high-molecular-weight thermosets and have developed methodologies suitable for molding articles from these materials. Unlike thermoplastics which, by definition, are reversibly melt-processable and usually of high molecular-weight and of high viscosity or standard thermosets, which are irreversibly formed from low molecular-weight precursors (monomers) of low viscosity, such bio-based materials are precursors of high molecular-weight that are irreversibly formed into thermosets. Injection molding is contemplated as a methodology suitable for molding these articles. In cases where adequate heat transfer and/or compression are not readily achieved, a modified form of injection molding, namely injection-compression molding (a.k.a. "coining"), may be a more suitable methodology. Insufficient heat transfer and/or compression during molding can lead to articles with inferior mechanical strength and/or possibly to premature degradation of the bio-based material during processing.

Injection molding is particularly difficult, as the material has a relatively narrow workable range, and the right combinations of temperature, time, and screw properties, including but not limited to shear, length, etc. play a role.

The term "injection molded article" as used herein is meant to include an article made by injection molding techniques described herein. The article will have properties similar to conventional injection molded plastics with regard to hardness, strength, durability, etc.

Mold temperature should be high enough to cure the material, but not high enough to degrade the material inside the mold. Mold temperature is established based on many factors, such as starting material composition, geometry of the part, etc. Generally a mold temperature of about 250 F to about 330 F is suitable. In some embodiments, a temperature of about 270 F to about 295 F is used.

In some embodiments, mold temperature should not exceed about 350 F. In some test runs, the part vaporized at this temperature when mold was opened.

Injection-compression molding (or "coining") yields best result and it requires a special "coining" mold. In the coining process, material is preferably injected directly into the molding cavity, and the material inside the molding cavity is subjected to higher compressive forces than it is in standard injection molding processes.

Preferably, coining hydraulics are used on the injection molding machine. The hydraulics should be able to tolerate increased compressive forces and remain stable during injection molding.

As used herein, "thermoset" means having the property of becoming permanently hard and rigid upon cooling after a heat cure.

As used herein, "thermoplastic" means having the property of softening or fusing when heated and of hardening and becoming rigid again when cooled.

A thermoset, unlike a thermoplastic, cannot be remelted and reshaped.

As used herein, "injection molding" means a process in which material is fed into a barrel, mixed, and forced into the molding cavity, where it hardens to the configuration of the cavity. Any type of injection molding is contemplated, including but not limited to standard injection molding, injection-compression molding, and injection-compression blow molding, although an injection-compression configuration is preferred.

Although the compression ratio will vary depending on choice of materials, temperatures employed, ambient conditions and other factors, generally a compression ratio of about 1.5:1 to about 3:1 is suitable for most applications. In some embodiments, a compression ratio of about 1.5:1, about 2:1, or about 3:1 or a range of compression ratios between any two of these values may be used.

As used herein, "injection blow molding" means a process for forming hollow articles, in which, for example and not limitation, a hollow tube like preform is injected into a mold and then expanded with blown gas to conform to the shape of the mold.

During their research, applicants noted that they could achieve desirable results by recognizing that the aforementioned natural materials, with their natural binding ability, behave more like high-molecular-weight thermosets than like thermoplastics. This is in contrast with prior art that teaches a two-step processing method: first blend the protein material with significant amounts of plasticizer, e.g. with 20-30% glycerol, ethanol, or octanoic acid, or a polymer in the presence of heat in order to form pellets; and afterwards, use these pellets in a second process (e.g. thermoforming or standard injection molding) to form the final article.

In contrast, the methods described herein use the as-received, bio-based material in combination with enough liquid to facilitate heat transfer. (Other components may be combined with the material, but are not necessarily required.) However, excess liquid can lead to the formation of bubbles or defects in the final article. Therefore, there are advantages to performing vacuum evacuation of the molding cavity during the compression step. A clamp can be used to generate compressive forces, but the preferred method is to build a hydraulic compression system into the tooling. (In a standard injection molding process, the clamp is responsible for opening and closing the mold.) It is also preferred to use a mold assembly with a wide window of compression ratio.

By "as-received" it is meant that the bio-based material has undergone minimal prior processing and can even be direct from the farm. Typically, the bio-based material is left over after more valuable materials are removed. The left over material has traditionally been fed to farm animals, but now can be captured and used as described herein.

Processing temperatures of the screw, barrel, and the mold should be controlled. Screw/barrel should be warm enough to facilitate flow and heat the liquid, but not so warm that the material dries out or hardens prematurely. Notably, unlike conventional resin systems, curing is not initiated in the screw/barrel. In some embodiments, the temperatures are below the boiling temperature of water, or other solvent used. Typical temperatures are about 50 F to about 70 F, or about 60 F to about 70 F.

Screw and barrel design also affect the final product. The ability to control the amount of shear is important to the product formed. Although a "compression" screw may be used, it is believed that use of a "metering" screw is advantageous. In some embodiments, the metering screw will have a relatively low length-to-diameter ratio (L:D ratio) which will reduce shear forces, among other things. The formulations described herein appear to perform better with less shear. Shear may be controlled by the rotation speed, the back pressure, and the injection speed of the screw. Shear, however, is mostly controlled by the design of the screw itself.

Among other things, a custom-made metering screw to facilitate proper mixing and agitation of the compound aids in the successful application of the material to the injection molding process. Unlike with most screws (e.g. screws for thermoplastics) the depth-of-flights in the custom-made screw do not vary along its length, and this results in reduced shear with respect to graduated depth-of-flights.

In the description that follows, reference is made to powders and/or pellets of the bio-based material. Although powder and pelletized forms are common and easy to work with, other forms of the bio-based material may be used. Reference to powders and pellets is for example only.

Material Consistency/Moisture Content:

The focus of the examples herein is on corn gluten meal and canola meal. However, any suitable bio-based material in powder or pellet form may be used. These powders are dry although some moisture content is acceptable and expected. Dry powders or pellets are more stable, do not require refrigeration, and have other suitable characteristics.

As alluded to above, insufficient moisture in the bio-based material can lead to poor heat transfer properties and result in an inferior final part. Also, without sufficient moisture, the material is unable to pass through the nozzle into the mold, and when the shear forces are too high, the powder may be over compacted, plugging up the nozzle and preventing the mold from being filled.

Sufficient moisture may be achieved by the addition of a liquid, such as but not limited to water or an aqueous-based solution such as a urea-water solution. Suitable amounts of moisture can vary depending on many factors, including the amount of water in the given starting material, the humidity when mixing, the ambient temperature, etc. Generally, however, an overall moisture content of about 10 to about 22%, about 13 to about 17%, or around 15% is suitable.

When urea is added to water, it is believed, without wishing to be bound by theory, that the lowering of the vapor pressure of the water caused by urea as a solute allows for more efficient heat transfer during molding. And this results in the production of more uniform parts. Glycerol or another hydrophilic molecule could be used in place of urea to achieve a similar result.

Additional ingredients may be added depending on the desired final properties or to facilitate the molding process. For example, and not by limitation, fillers, flow agents, and other materials may be added.

On the other hand, when there is too much moisture, the material may form clumps, may not feed properly and may adhere to screw, again resulting in the inability to produce articles and undesirable down time. Although it will depend on several factors, such as bio-based material used, RH conditions, additives, etc. a moisture content of not more than about 18% is suitable. In some embodiments, the moisture content may be about 10%, 15%, 18%, 20%, 25%, or any range between any two of those values.

In some embodiments, a process for injection molding an article from a bio-based material comprises:

providing a mold, optionally heated;

combining a bio-based material, such as powder or pellets, with an aqueous solution;

introducing the hydrated powder or pellets to the hopper of an injection molding apparatus at elevated temperature between about 50 and about 75 F;

feeding the hydrated bio-based material from the hopper to the barrel with minimal shear;

injecting the resultant hydrated bio-based material into the mold; and heating and compressing the hydrated bio-based material within the mold to form an article.

In some embodiments the bio-based material is powderized or pelletized.

In some embodiments, the aqueous solution may be water, a urea solution, etc.

In some embodiments, the ratio of bio-based material to aqueous solution is about 5:1 to about 10:1. In some embodiments, the ratio is about 5:1 to about 7:1.

In some embodiments, the aqueous solution is aqueous urea.

The materials and injection molding techniques described herein can be used to form any molded article, including but not limited to bottles, caps, overcaps, closures, toys, packaging, machine parts, rollers, utensils, tiles, game pieces, hooks, handles, razors, trays, containers, tokens, golf tees, frames, lids, and other injection molded products.

EXAMPLES

Tests were run on both a BOY 22A injection molding machine (Formulations 1-10) and a BOY 22E injection molding machine (Formulations 11-15).

Both the corn gluten meal and canola meal were used as-received.

Formulations 1-3

Formulations 1-3 all use a screw and barrel designed for molding liquid silicone rubber ("LSR") parts. Although this arrangement is more suitable than a standard rotating and reciprocating screw used to injection mold standard thermoplastic parts (a "thermoplastic" screw), it was used in our preliminary experiments because the custom-made metering screw wasn't yet available and it was the best alternative that we had available. By using a metering screw, better control of the shear was attained.

Formulation 1

240 g corn gluten meal (supplied by McGeary Grain, Inc.) was mixed with 36.0 g 15% w/w 4M aqueous urea solution (276.0 g total). The material was then placed in a BOY 22A injection molding machine (Boy Machines, Inc.) and injection molded.

This material appeared to have good flow and "melting" properties and appeared to behave well in the barrel, although there was some challenge getting material to flow through the nozzle.

Formulation 2

240 g corn gluten meal was mixed with 24 g 10% w/w 4M aqueous urea solution (264 g total). The material was then fed into the BOY 22A injection molding machine and injection molded.

The material successfully passed through nozzle, however the moisture content was too low in this particular run, as one could hear the grinding that was occurring as the screw rotated inside the barrel.

Formulation 3

132 g corn gluten meal was mixed with 26 g 20% w/w 4M aqueous urea solution (158 g total). The material was then placed in the BOY 22A injection molding machine and injection molded. Material passed through nozzle but somewhat sporadically. Material had a much greater tendency to stick to the screw and/or barrel as the screw was turning, therefore in subsequent experiments, lower amounts of solution were used.

Formulation 4 (Control)

Formulation 4 was used with a standard thermoplastic (or "compression") screw and barrel. Screw and barrel were initially set at about 143° C. (about 290 F) and mold was set at about 110° C. (about 230 F).

7% (w/w) sorbic acid powder was mixed with dry corn gluten powder.

Formulation 5

Formulation 5 was used with the custom-made screw in a BOY 22A Boy injection molding machine. The mold temperature was set at 300 F to 320 F and the temperature of the screw was held at 75° C. Two batches of material were prepared: a) 480 g corn gluten+72 g 4M urea solution: 552 g total; b) 480 g corn gluten+80.5 g 4M urea solution: 560.5 g total.

Formulation 6 (Control)

480 g corn gluten & 80 g water. Mold temperature set at 300 F. Mixture with just water didn't yield uniform samples as in previous run. Evidence of bubbling at surface of specimens.

Formulation 7

Formulation 7 was prepared by combining corn gluten meal with 4M urea solution and water. (480 g corn gluten was first added and then 4M urea solution, yielding a total weight of 510.5 g. And afterwards additional water was added, and the total weight was 551 g. This resulted in a mixture with roughly 2M urea solution. A higher concentration of urea solution yields higher quality specimens under the same processing conditions.

Formulation 8

Formulation 8 was prepared like Formulation 5: (480 g corn gluten+81 g 4M urea solution: 561 g total). Mold temperature was set at 300 F.

Formulation 9 (Control)

In Formulation 9, no water was deliberately added to corn gluten, and nozzle got clogged.

Formulation 10

In Formulation 10, 480 g granulated corn gluten (97% corn gluten meal, 3% molasses pellet binder; purchased from Uhler's, Malvern, Pa.), was combined with 35 g water, yielding a total mass of 515 g total, and the nozzle (with a smaller orifice) once again got clogged.

Formulation 11

The following experiments were conducted using a BOY 22E Boy injection molding machine. In Formulation 11, 481 g corn gluten meal was combined with 80 g 4M urea solution, yielding a total weight of 561 g. The mold temperature was set at 280 F and the screw and barrel were set at 65 F. A custom-made coining tool was used, and several specimens were produced (namely, 2-inch diameter discs). The specimens were molded at a 2:1 compression ratio.

Formulation 12

Formulation 12 was prepared the same way as Formulation 11, and specimens were molded at 250 F, 270 F, 290 F, 300 F, and 320 F.

Formulation 13

481 g canola meal (supplied by Archer Daniels Midland, Velva, N. Dak.) was combined with 80 g 4M urea solution, yielding a total weight of 561 g. Mold temperature was set at 280 F and specimens were molded at a 2:1 compression ratio. The screw and barrel temperature ranged between 65 F to 100 F.

Formulation 14

480 g canola meal (supplied by Archer Daniels Midland, Windsor, Ontario, Canada) was combined with 63 g 4M urea solution, yielding a total weight of 543 g. Specimens were molded at both 280 F and 300 F at a 2:1 compression ratio.

Formulation 15

270 g corn gluten meal (supplied by McGeary Grain, Inc.) was combined with 46 g 4M urea solution, yielding a total weight of 316 g. Specimens were molded at 300 F at a 2:1 compression ratio.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "comprises" should be interpreted as "includes but is not limited to," etc.).

It should also be understood, that although various compounds, compositions, methods, and devices are described in "open" terms of "comprising," "including," or "having" various components or steps (interpreted as meaning "including, but not limited to"), the compounds, compositions, methods, and devices can also "consist essentially of" or "consist of" the various components and steps, and such terminology should be interpreted as defining essentially closed-member groups. This paragraph is not meant in any way to limit the meaning of "comprising", "having," or "including" (and other verb forms thereof), which are to be interpreted as open-ended phrases meaning "including but not limited to" consistent with patent law and custom. The intent of this paragraph is merely to indicate that the closed-member groups defined by the "consisting of" or "consisting essentially of" language are lesser included groups within the open-ended descriptions and to provide support for claims employing the "consisting of" or "consisting essentially of" language.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 substituents refers to groups having 1, 2, or 3 substituents. Similarly, a group having 1-5 substituents refers to groups having 1, 2, 3, 4, or 5 substituents, and so forth.

What is claimed is:

1. A process for injection molding an article from a thermosetting bio-based material of high molecular weight comprising the steps of:
   providing a mold;
   introducing said thermosetting bio-based material of high molecular weight in combination with sufficient liquid to facilitate heat transfer into an injection molding apparatus including a screw and barrel adapted for low shear to facilitate movement of the bio-based material through the barrel;
   injecting said thermosetting bio-based material of high molecular weight into the mold, wherein the mold temperature is about 250° F. to about 330° F.; and
   compressing and curing the material within the heated mold to form the article.

2. The process according to claim 1, wherein the compressing step occurs at a compression ratio of about 1.5:1 to about 3:1.

3. The process according to claim 1, wherein the compressing step occurs at a compression ratio of about 2:1.

4. The process of claim 1, wherein the liquid is an aqueous solution selected from water, a urea solution, or a combination thereof.

5. The process of claim 4, wherein the bio-based material and the aqueous solution are present in a ratio of about 5:1 to about 10:1.

6. The process of claim 5, wherein the ratio is about 5:1 to about 7:1.

7. The process of claim 1, wherein the screw and barrel temperature is about 50° F. to about 75° F.

8. The process of claim 1, wherein the bio-based material is in the form of a powder or pellets.

9. The process of claim 1, wherein the bio-based material is selected from corn gluten meal, corn gluten feed, distillers dried grains with solubles, wet distillers grains, modified wet distillers grains, canola meal, wheat gluten, barley, cottonseed meal, sunflower meal, linseed meal, soy, rapeseed, sorghum proteins, maize, rice proteins, potato proteins, cassava proteins, sweet potato proteins, yam proteins, plantain proteins, lignin, keratin, collagen, and combinations thereof.

10. The process of claim 4, wherein the aqueous solution is about 15% w/w 4M aqueous urea solution.

11. A process for injection molding an article with a thermosetting bio-based material of high molecular weight comprising the steps of:
    introducing the bio-based material in combination with sufficient liquid to facilitate heat transfer to an injection molding apparatus including a screw and barrel adapted for processing with minimal shear to facilitate movement of the bio-based material through the barrel, wherein the screw and barrel temperature is about 50° F. to about 75° F.;
    injecting the material into a mold, wherein the mold temperature is about 250° F. to about 330° F.; and
    compressing and curing the material within the heated mold to form an article.

12. A process for injection molding an article with a thermosetting bio-based material of high molecular weight comprising the steps of:
- combining said thermosetting bio-based material of high molecular weight with an aqueous solution;
- introducing the hydrated thermosetting bio-based material of high molecular weight to an injection molding apparatus including a screw and barrel adapted for processing with minimal shear to facilitate flow of the bio-based material through the barrel;
- injecting the thermosetting bio-based material of high molecular weight into a mold, wherein the mold temperature is about 250° F. to about 330° F.; and
- compressing and curing the material within the heated mold to form an article.

* * * * *